(12) United States Patent
Klimczak et al.

(10) Patent No.: US 11,485,090 B2
(45) Date of Patent: Nov. 1, 2022

(54) APPARATUS, SYSTEM, AND METHOD OF CHARACTERIZING FILAMENT PROPERTIES AND ADJUSTING 3D PRINTER PARAMETERS FOR DECREASED FILAMENT DEPOSITION VARIABILITY

(71) Applicant: JABIL INC., St. Petersburg, FL (US)

(72) Inventors: Scott Klimczak, St. Petersburg, FL (US); Darin Burgess, St. Petersburg, FL (US); Randy Crockett, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 176 days.

(21) Appl. No.: 17/012,543

(22) Filed: Sep. 4, 2020

(65) Prior Publication Data
US 2022/0072794 A1    Mar. 10, 2022

(51) Int. Cl.
| | | |
|---|---|---|
| *B29C 64/393* | (2017.01) | |
| *B29C 64/118* | (2017.01) | |
| *B33Y 10/00* | (2015.01) | |
| *B33Y 30/00* | (2015.01) | |
| *B29C 48/28* | (2019.01) | |
| *B33Y 40/00* | (2020.01) | |
| *B29C 64/321* | (2017.01) | |

(Continued)

(52) U.S. Cl.
CPC ............ *B29C 64/393* (2017.08); *B29C 48/05* (2019.02); *B29C 48/28* (2019.02); *B29C 64/118* (2017.08); *B29C 64/314* (2017.08); *B29C 64/321* (2017.08); *B33Y 10/00* (2014.12); *B33Y 30/00* (2014.12); *B33Y 40/00* (2014.12); *B33Y 50/02* (2014.12); *B29C 64/343* (2017.08)

(58) Field of Classification Search
CPC ... B29C 64/393; B29C 64/343; B29C 64/321; B29C 64/314; B29C 64/118; B29C 48/28; B29C 48/05; B33Y 10/00; B33Y 30/00; B33Y 40/00; B33Y 50/02
USPC .................................. 264/409, 308; 425/375
See application file for complete search history.

(56) References Cited

U.S. PATENT DOCUMENTS

| | | |
|---|---|---|
| 6,022,207 A | 2/2000 | Dahlin et al. |
| 6,054,077 A | 4/2000 | Comb et al. |

(Continued)

FOREIGN PATENT DOCUMENTS

DE    102017100170 A1    2/2018

OTHER PUBLICATIONS

Investigating pressure advance algorithms for filament-based melt extrusion additive manufacturing: theory, practice and simulations; Sigmund Arntsonn Tronvoll, Sebastian Popp, Christer Westum Elverum and Torgeir Welo; Rapid Prototyping Journal 25/5 (2019) pp. 830-839; Emerald Publishing Limited [ISSN 1355-2546] [DOI 10.1108/RPJ-10-2018-0275].

(Continued)

*Primary Examiner* — Joseph S Del Sole
*Assistant Examiner* — Lawrence D. Hohenbrink, Jr.
(74) *Attorney, Agent, or Firm* — Shumaker, Loop & Kendrick, LLP; James D. Miller

(57) ABSTRACT

An apparatus, a system, and a method for improvements in fused filament fabrication (FFF). Characteristics of a filament may be measured during production of the filament and the characteristics stored in a memory for retrieval by a 3D printer. The 3D printer adjusts print settings as necessary based on the measured characteristics, thereby resulting in better print quality.

12 Claims, 3 Drawing Sheets

(51) Int. Cl.
  *B29C 48/05* (2019.01)
  *B29C 64/314* (2017.01)
  *B33Y 50/02* (2015.01)
  *B29C 64/343* (2017.01)

(56) References Cited

U.S. PATENT DOCUMENTS

| | | | |
|---|---|---|---|
| 6,085,957 A * | 7/2000 | Zinniel | B65H 51/30 |
| | | | 226/43 |
| 6,547,995 B1 | 4/2003 | Comb | |
| 6,814,907 B1 | 11/2004 | Comb | |
| 7,520,740 B2 | 4/2009 | Wahlstrom et al. | |
| 8,658,250 B2 | 2/2014 | Batchelder et al. | |
| 10,254,499 B1 | 4/2019 | Cohen et al. | |
| 2011/0121476 A1 | 5/2011 | Batchelder et al. | |
| 2014/0117585 A1 * | 5/2014 | Douglas | B29C 64/386 |
| | | | 264/401 |
| 2015/0209978 A1 | 7/2015 | Snyder et al. | |
| 2016/0361869 A1 | 12/2016 | Mark et al. | |
| 2017/0066188 A1 | 3/2017 | Luo et al. | |
| 2017/0120528 A1 | 5/2017 | Tejada Palacios et al. | |
| 2018/0001565 A1 * | 1/2018 | Hocker | G01N 23/223 |
| 2019/0001577 A1 | 1/2019 | Hocker | |

OTHER PUBLICATIONS https://prusament.com/spool/sample; Prusa Glaxay Black; Lion model made by 3DWP.nl, download STL | PETG Clamp model by InquisitiveKangaroo, download STL | 2020 © Prusa Polymers a.s.
https://hackaday.com/2016/02/05/filament-thickness-sensors-what-are-they-and-what-are-they-good-for/; Filament Thickness Sensors, What are They and What are They Good for?; Gerrit Coetzee.
https://prusament.com/spool/?spoolId=27eb914f; Carmine Red Transparent; Lion model made by 3DWP.nl, download STL | PETG Clamp model by InquisitiveKangaroo, download STL | 2020 © Prusa Polymers a.s.
https://prusament.com/#check-spool; Filament by Josef Prusa; Lion model made by 3DWP.nl, download STL | PETG Clamp model by InquisitiveKangaroo, download STL | 2020 © Prusa Polymers a.s.

* cited by examiner

APPARATUS, SYSTEM, AND METHOD OF CHARACTERIZING FILAMENT PROPERTIES AND ADJUSTING 3D PRINTER PARAMETERS FOR DECREASED FILAMENT DEPOSITION VARIABILITY

FIELD

The present disclosure relates to additive manufacturing, and, more specifically, to an apparatus, system, and method of characterizing filament properties and adjusting 3D printer operational parameters for minimized filament deposition variability.

BACKGROUND

Additive manufacturing, including three dimensional printing, represents a very significant advance in the development of not only printing technologies, but also of product research and development capabilities, prototyping capabilities, and experimental capabilities, by way of example. Of available additive manufacturing technologies (collectively "3D printing"), fused filament fabrication ("FFF") printing is one of the most significant types of 3D printing that has been developed.

FFF is an additive manufacturing technology that allows for the creation of 3D elements on a layer-by-layer basis, starting with the base or bottom layer of a printed element and printing until the top or last layer. The layers are formed, for example, by heating and extruding thermoplastic filaments into the successive layers. Simply stated, an FFF system includes a print head with a material guide leading to a heated nozzle, wherein the print material filament is fed through the material guide. The FFF system further includes an X-Y planar control for moving the print head in the X-Y plane and a print platform, upon which the base is printed and which additionally moves in the Z-axis as successive layers are printed.

More particularly, the FFF printer nozzle transfers heat to the thermoplastic print filament received through the material guide from the print head, thereby converting the print filament to a semi-liquid state. Typically, the semi-liquid thermoplastic is deposited in variably sized beads along the X-Y planar extrusion printing path plan provided for building of each successive layer of the element. The printed bead/trace size may vary based on the par, or aspects of the part being printed. Further, if structural support is needed within a part, the trace printed by the FFF printer may include removable material. The removable material is subsequently removed to form a scaffolding to provide the support within the part where needed. Accordingly, FFF may be used to build simple or complex geometries for experimental or functional parts such as for prototyping, low volume production, manufacturing aids, and the like.

FFF printers feed the filament material to the print head from a spool. A consistent filament diameter is essential for delivering a consistent amount of filament during a print job because a volume of the filament that is delivered per unit of length of the filament deposited is a function of the filament's diameter. Thus, if the diameter varies from an expected diameter (for example, the diameter is on the high or low side of the reported tolerance for the filament), then the volume of the filament that is deposited will be too much or too little. When purchasing the filament for 3D printing, consumers can buy filament with tighter diameter tolerances, however there are limitations to how tight the tolerance can be for the filament diameter during production of the filament. There is a need in the art for an FFF printer that makes adjustments to the printer based on the exact spool that is being fed to the machine. By compensating for deviations in the diameter of the filament, more consistent printed parts can be produced.

There is a need in the art for an apparatus, system, and method of making 3D printer adjustments to compensate for variations in the diameter of the filament based on information that is specific to the spool of the filament that is being fed to the printer.

SUMMARY

The disclosed exemplary apparatus, system, and method can be utilized to make 3D printer adjustments to compensate for variations in the diameter of the filament based on information that is specific to the spool of the filament that is being fed to the printer.

In an embodiment, the apparatus comprises a filament spool including an indicium; a sensing device configured to read the indicium; a first memory storing physical characteristic data for the filament spool, the physical characteristic data accessible by reading the indicium; a print head configured to feed a print material filament from a spool through a material guide to a heated nozzle; an X-Y planar control for moving the print head in the X-Y plane; a print platform upon which a base is printed; and a processor to execute a print parameter based on the physical characteristic data.

In a system of an embodiment, the system for producing a print material filament comprises an extruder including a sensor to measure a characteristic of the print material filament exiting the extruder; a spooler configured to wind the filament on a spool, the spool including an indicium; and a memory that stores the characteristic of the print material filament and the indicium and links the characteristic of the print material filament and the indicium for retrieval of the characteristic of the print material filament by a 3D printer, wherein the 3D printer is configured to modify a print parameter based on the characteristic of the print material filament.

A method according to an embodiment comprises the steps of providing a print head configured to feed a print material filament from a spool through a material guide to a heated nozzle, an X-Y planar control for moving the print head in an X-Y plane, and a print platform upon which a base is printed; detecting a filament spool indicium; correlating the filament spool indicium to a physical characteristic of the print material filament stored in a first memory; and modifying a print parameter responsive to the physical characteristic of the print material filament.

Another method comprises extruding a filament and measuring a filament material characteristic of the filament exiting an extruder; winding the filament onto a spool marked with an indicium; and storing the filament material characteristic measured and linking to the indicium in a memory for retrieval by a 3D printer that modifies a print parameter based on the filament material characteristic.

BRIEF DESCRIPTION OF THE DRAWINGS

The above, as well as other advantages will become readily apparent to those skilled in the art from the following detailed description of embodiments when considered in light of the accompanying drawings which.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term. Spatially relative terms, such as "front," "back," "inner," "outer," "bottom," "top," "horizontal," "vertical," "upper," "lower," "side," "up," "down," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
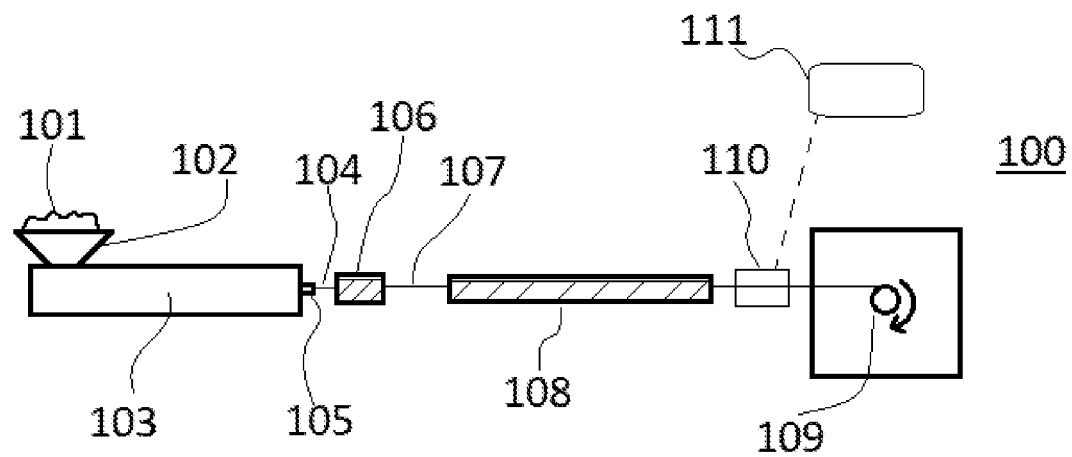
FIG. 1 is a schematic diagram showing a filament extrusion process.

FIG. 1 illustrates a filament extrusion process 100. The process 100 includes a hopper 102 in communication with an inlet of an extruder 103. It is understood that the extruder 103 can be any convention extruder, as desired, such as a single or double screw extruder. An outlet of the extruder 103 is in communication with a die or discharge component 105. The die 105 is configured to discharge a material 101 from the extruder 103 in a desired size and shape. The die 105 is in communication with a cooling apparatus 106. The cooling apparatus 106 can be any cooling or heat transfer apparatus, as desired, capable of cooling the material 101 in a desired time and to a desired temperature. A cooling bath 108 in in communication with the cooling apparatus 106 in an upstream direction and a filament spool 109 in a downstream direction with respect to a direction of flow of the material 101 through the process 100. The filament spool 109 is configured to wind a continuous spool of the material 101 thereon.

During operation of the process 100, the material 101 is added to the hopper 102. The material 101 may be in the form of pellets or small pieces or have other shapes and configurations as desired. The material 101 may comprise a polymer or other material having desired properties for use as a filament of a 3D printing process. The extruder 103 receives the material 101, melts the material 101 by applying heat, and forces the melted material 104 through the die 105. After the melted material 104 exits the die 105, it is cooled by the cooling apparatus 106 to a desired temperature and solidifies to form a solid filament 107. The cooling apparatus 106 may use air or other fluid as a heat exchange medium, as desired, to remove heat from the melted material 104. The cooling apparatus 106 may provide a volume of a cooling fluid for the melted material 104 to pass through. The cooling fluid may be constantly added to and removed from the cooling apparatus 106 in order to maintain a set point temperature for the cooling fluid in the cooling apparatus 106. The cooling fluid may be water, an aqueous solution, or other conventional cooling fluids as desired.

FIG. 1 also shows the cooling bath 108. Whereas the cooling apparatus 106 may rapidly cool the melted material 104, the cooling bath 108 may further cool the solid filament 107 at a lower temperature reduction rate. The hot, melted material 104 may be cooled to a temperature below a melting point of the material 101 forming the solid filament 107. For example, the hot, melted material 104 may be cooled to a temperature between 65° F. and 150° F. The desired, cool temperature may be achieved by the cooling apparatus 106 alone or by a combination of the cooling apparatus 106 and the cooling bath 108. A residence time that the solid filament 107 spends in the cooling bath 108 may be longer than a residence time that the solid filament 107 spends in the cooling apparatus 106. The cooling bath 108 may comprise a heat exchange fluid or other cooling medium as desired. The heat exchange fluid may be water, an aqueous solution, or other heat exchange fluid, for example.

Warm (heated) or ambient air may be blown across the solid filament 107 to dry excess heat exchange fluid from the filament 107. Alternatively, an infrared (IR) oven may be used to dry excess heat exchange fluid from the filament 107. The solid filament 107 may be wound onto the filament spool 109 and the filament spool 109 may then be used in an FFF printer to print a 3D printed object. The filament spool 109 may be marked with an indicium that is unique to that spool.

A diameter, ovality, and other properties or characteristics of the filament 107 may be measured by a sensing device, a sensor, or an instrument 110. As a non-limiting example, the instrument 110 may be a laser micrometer. The laser micrometer includes an emitter or emitters that scan a measurement field with a laser or lasers. When an object is present in the measurement field, the object's shadow is cast into a receiver which can use this information to determine the diameter, the ovality, and other properties and dimensions of the filament 107. Production data may be received by the instrument 110 and uploaded and stored, along with a unique indicium of the spool 109 (such as a barcode, a QR code or an RFID, for example) in a database 111 stored on a storage device such as a hard drive, the internet, or other conventional storage devices. Optionally, data may be stored on an RFID to eliminate the need for an end user to connect to the internet. Production data may include one or more of the following: filament diameter, filament ovality, filament tolerance, filament extrusion temperature during filament production, filament cooling temperature during filament production, filament cooling rate during production (after being extruded), filament extrusion die size, filament production rate (amount of filament forced through an extrusion die per unit of time), the number of sensors that were used to measure filament diameter and/or ovality, the type and/or model number of the sensor(s) (or instrument) used to measure filament diameter and/or ovality, the geographical location of filament production, and the origin of raw materials that were used to produce a filament. In general, any data that is captured in the manufacturing process may be stored and used to enhance a 3D print. A filament's properties may be cataloged as a function of filament location within a spool of filament. For example, the filament may be segmented by length and each segment may have a stored physical property. A 3D printer could make adjustments to print settings (for example, extrusion ratio or extrusion temperature) based on the properties of the filament segment being printed at a given time. In this case, a 3D printer would know, for example, that the first foot of filament has diameter X (or some other measured property), the second foot of filament has diameter Y, and the third foot of filament has diameter Z. The unit of length could be smaller (for example, every inch of filament could have a corresponding diameter or other property) to provide more granularity and more frequent 3D printer compensations. Conversely, the unit of length could be larger (for example, every 2 feet of filament could have a corresponding diameter or other physical property) to reduce the amount of data that is stored. The database 111 may be stored on the storage device for data retrieval and/or further processing. Thus, physical properties of the filament 107 on the spool 109 are measured and stored for later use.

In the prior art, filament manufacturers have been able to reduce filament diameter tolerances from ±0.07 mm to ±0.05 mm, with present targets of ±0.03 mm and even ±0.02 mm. Without compensating for the tolerances of the filament 107 for the specific spool being printed, there will always be a deviation in printed dimensions when the tolerance for the diameter of the filament 107 that is greater than zero.

Figure 2:
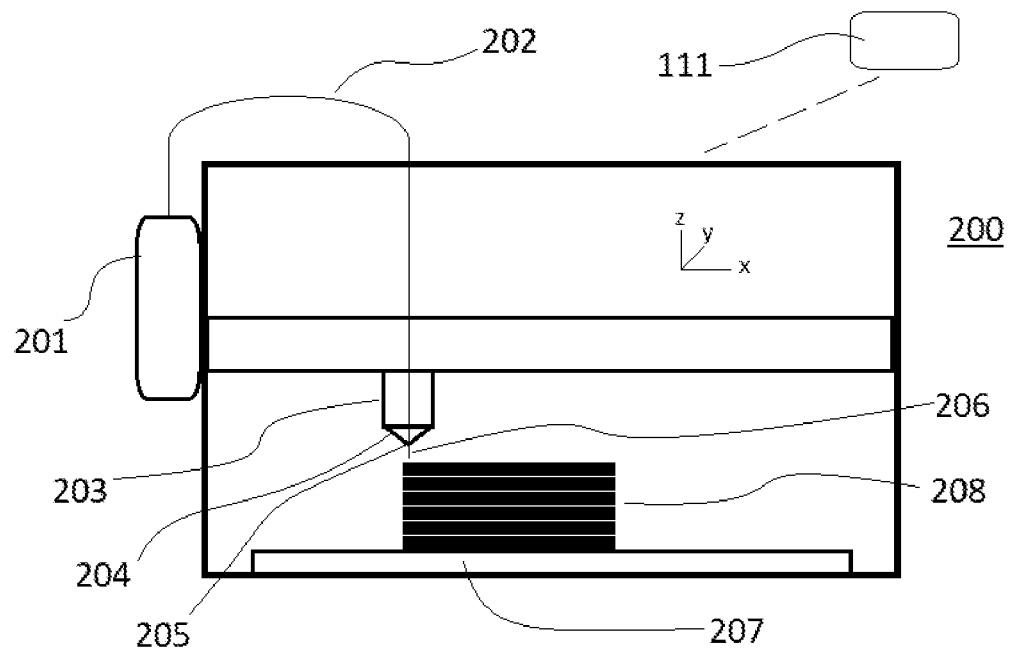
FIG. 2 is a schematic elevational view of an additive manufacturing system.

FIG. 2 illustrates an additive manufacturing system 200. The additive manufacturing system 200 can be a fused filament fabrication (FFF) system as shown in FIG. 2. However, other additive manufacturing systems 200 can be used without departing from the scope of the invention. The additive manufacturing system includes a filament spool 201 disposed on a spindle. The filament spool 201 includes a filament 202 wound thereon, wherein the filament is fed to a print head 203. A nozzle 204 including a nozzle tip 205 is formed on the print head 203. The additive manufacturing system 200 further includes a build plate 207 configured to support a 3D printed object 208 formed from liquefied or partially liquefied filament.

In operation, the filament spool 201 of the additive manufacturing system 200 stores the filament 202 thereon in a wound manner. The filament 202 moves from the filament spool 201 to the print head 203 via hobs or gears (not shown). The print head 203 includes a heated section (not shown) that liquefies the filament 202 being fed thereto so that the filament 202 is liquefied or partially liquefied when it exits the nozzle 204 at the nozzle tip 205. The liquefied or partially liquefied filament 206 is initially deposited onto the build plate 207. It is understood that multiple spools and filaments may be fed to the print head for depositing on the build plate 207 if desired. The print head 203 moves about in the x, y, and z directions the liquefied or partially liquefied filament 206 is deposited onto the build plate. It is further understood that the build plate can be moved in the x, y, and z directions and the print head 203 may be stationary without departing from the scope of the invention. Upon cooling, the liquefied or partially liquefied filament 206 deposited on the build plate 207 solidifies and becomes part of the 3D printed object 208.

Variability in an amount of the liquefied or partially liquefied filament 206 deposited contributes to irregularities in the 3D printed object 208. For a given length of the filament 202 moving through the print head 203 that is deposited as the liquefied or partially liquefied filament 206, the total volume of the liquefied or partially liquefied filament 206 deposited is a function of the diameter of the filament 202. For example, if the diameter of the filament 202 is larger than a target diameter, the volume of the liquefied or partially liquefied filament 206 deposited will be larger than the targeted volume. Conversely, if the diameter of the filament 202 is smaller than a desired target, the volume of the liquefied or partially liquefied filament 206 deposited will be less than the targeted volume. The mass and dimensions of the 3D printed object 208 from these two examples will therefore vary because of the variability in the diameter of the filament 202. In order to achieve consistency among the 3D printed objects 208, a constant diameter of the filament 202 is important. One way to achieve the consistent diameter of the filament 202 is to tightly control the diameter of the filament 202 during the extrusion process, while discarding any filament that is out of a specified tolerance of the diameter of the filament 202. The embodiments disclosed herein correct or compensate for a variation in the diameter of the filament 202 during the 3D printing process. If the diameter of the filament 202 being fed to the 3D printer is larger than the target diameter, the 3D printer will change print parameters to account for the larger diameter. For example, a feed rate for the filament 202 may be reduced for a given speed of the print head 203 so that the target volume of the liquefied or partially liquefied filament 206 is deposited for a given length of filament deposition. Conversely, if the diameter of the filament 202 being fed to the 3D printer is smaller than the target diameter, the 3D printer will increase the feed rate of the filament 202 for a given print head speed so that the target volume of the liquefied or partially liquefied filament 206 is deposited for a given length of filament deposition.

As shown in FIG. 2, data stored for a given spool of filament 202 may be retrieved from the database 111 created during the process 100, and used to modify print parameters such as filament feed rate. By way of example, the feed rate of the filament 202 may be increased or decreased to compensate for the diameter of the filament 202 being fed. In this way, the deposited volume of the filament 202 is more consistent and is less dependent on consistency of the filament 202 during production of the filament 202. The physical properties of the filament 202 of the spool 201 are measured during production of the filament 202 and stored on database 111, which could be an internet website or a hard drive of a computer, for example. After transferring or purchasing the spool 201 of the filament 202, an end-user scans the barcode, QR code, or RFID on the spool 201. The barcode, QR code, or RFID links to the website or hard drive that holds production data for the exact spool 201 being used. The end-user's 3D printer receives the data and modifies print parameters to make adjustments as necessary. For example, the 3D printer's extrusion ratio or feed rate may be adjusted based on the diameter of the filament 202.

The filament spool 201 may comprise an RFID, QR code, or barcode that can be scanned by the printer to identify the filament spool 201 and to look up production data for the filament spool 201. The production data may comprise minimum diameter and maximum diameter for the filament 202 of a given filament spool 202. However, other production data can be provided and used without departing from the scope of the invention. The 3D printer may use the data to change an extrusion ratio of the print head 203. The extrusion ratio is defined here as a ratio of the feed rate of the filament 202 (length of filament dispensed from the nozzle per unit time) to a speed of the print head 203 (distance traveled per unit time). If the extrusion rate is set for an assumed filament diameter and the actual filament diameter is less or more than the assumed filament diameter, too little or too much filament will be extruded which results in a 3D printed part that is lacking material (as evidenced by gaps or areas that are too thin, for example) or that has too much material (as evidenced by areas that are too thick or areas that contain excess material, for example). Adjusting the extrusion ratio based on the actual diameter of the filament 202 that is being fed to the 3D printer optimizes the quality of a 3D printed object and reduces dimensional tolerances, compared to adjusting the extrusion ratio based on the average filament diameter for a batch of multiple spools.

Figure 3:
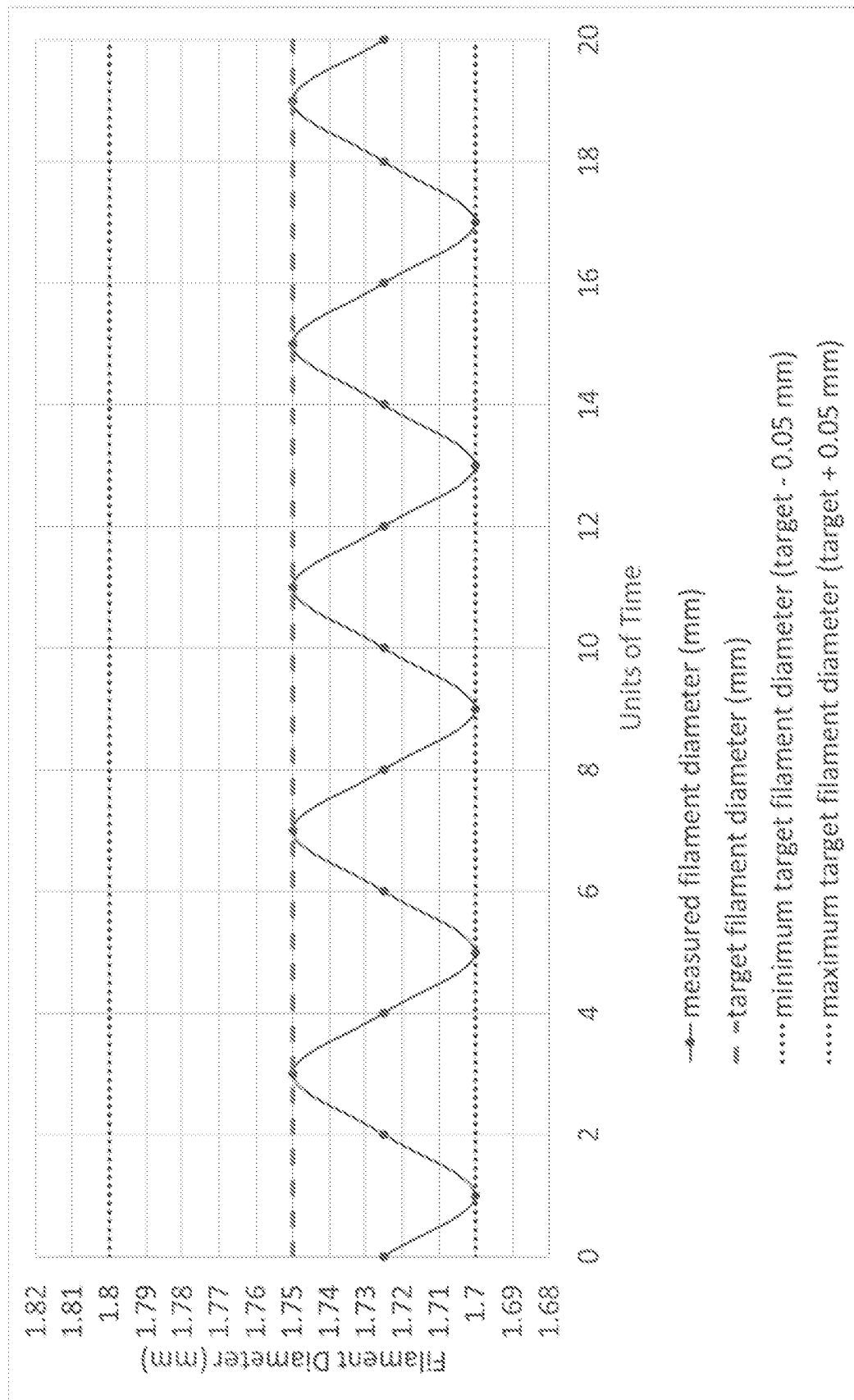
FIG. 3 is a graph of filament diameter to a unit of time for a filament production process.

Compensating for variations in the filament 2024 on a per-spool basis is especially beneficial for filament production processes that produce filament with a consistent offset from the target diameter for a given spool. For example, FIG. 3 shows a possible scenario where a filament production process is targeting a filament diameter of 1.75 mm with a tolerance of ±0.05 mm. As shown in FIG. 3, the actual filament diameter being produced (for one spool) is continuously between 1.70 mm and 1.75 mm (hovers around 1.725 mm). The filament depicted in FIG. 3 would typically be marketed and sold as a 1.75 mm±0.05 mm filament. However, when the production data for that spool is collected during production, stored in a retrievable location, retrieved by a 3D printer, and used by the 3D printer to make print adjustments to compensate for the actual filament diameter, a better-quality print will result. Effectively, the 3D printed part (printed in a printer that adjusts print properties such as extrusion rate, based on filament production data for a given spool) would have the quality of a 3D printed part that was printed with a ±0.025 mm tolerance filament.

Figure 4:
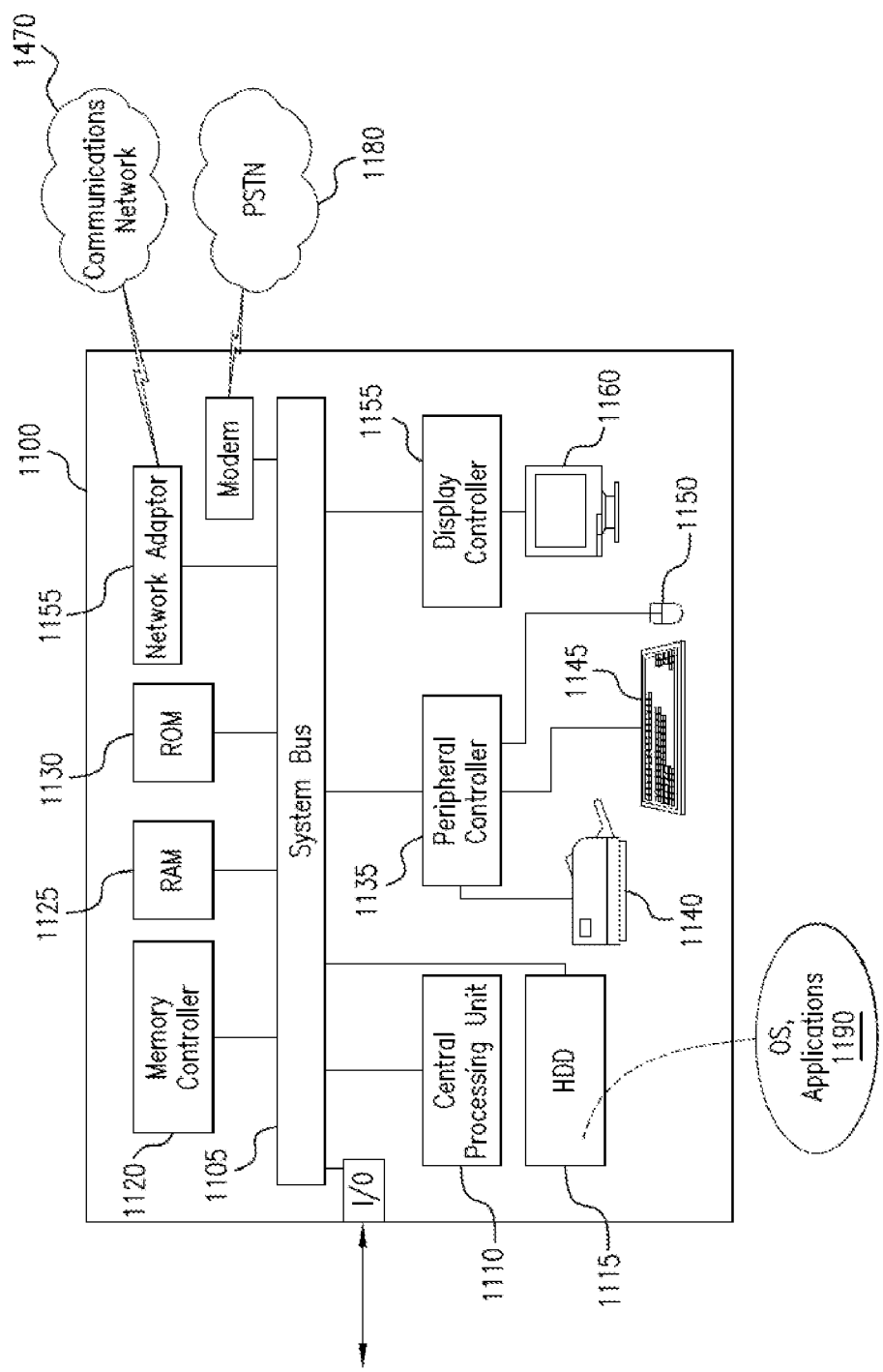
FIG. 4 is a schematic diagram showing an exemplary computing and control system.

FIG. 4 depicts an exemplary computing and control system 1100 for use in association with the herein described systems and methods. The computing and control system 1100 is capable of executing software such as an operating system (OS) and/or one or more computing applications/algorithms 1190 such as applications applying the print plan, monitoring, process controls, process monitoring, and process modifications discussed herein, and may execute such applications 1190 using the data such as materials and process-related data which may be stored in a storage database 1115 locally or remotely.

More particularly, the operation of an exemplary computing system 1100 is controlled primarily by computer readable instructions such as instructions stored in a computer readable storage medium, such as a hard disk drive (HDD) 1115, an optical disk (not shown) such as a CD or DVD, a solid state drive (not shown) such as a USB "thumb drive," or the like. Such instructions may be executed within a central processing unit (CPU) 1110 to cause computing system 1100 to perform the operations discussed herein. In many known computer servers, workstations, personal computers, and the like, the CPU 1110 is implemented in an integrated circuit called a processor.

It is appreciated that, although the exemplary computing system 1100 is shown to comprise a single CPU 1110, such description is merely illustrative, as the computing system 1100 may comprise a plurality of the CPUs 1110. Additionally, the computing system 1100 may exploit the resources of remote CPUs (not shown), for example, through a communications network 1470 or some other data communications means.

In operation, the CPU 1110 obtains, decodes, and executes instructions from a computer readable storage medium such as the HDD 1115. Such instructions may be included in software such as an operating system (OS), executable programs such as the aforementioned correlation applications, and the like. Information such as computer instructions and other computer readable data is transferred between components of computing system 1100 via the system's main data-transfer path. The data may include a physical characteristic lookup table for the spool, for example. The main data-transfer path may use a system bus architecture 1105, although other computer architectures (not shown) can be used such as architectures using serializers and deserializers and crossbar switches to communicate data between devices over serial communication paths. The system bus 1105 may include data lines for sending data, address lines for sending addresses, and control lines for sending interrupts and for operating the system bus 1105. Some busses provide bus arbitration that regulates access to the bus by extension cards, controllers, and the CPU 1110.

Memory devices coupled to the system bus 1105 may include random access memory (RAM) 1125 and/or read only memory (ROM) 1130. Such memories include circuitry that allows information to be stored and retrieved. The ROMs 1130 generally contain stored data that cannot be modified. The data stored in RAM 1125 can be read or changed by the CPU 1110 or other hardware devices. Access to the RAM 1125 and/or the ROM 1130 may be controlled by a memory controller 1120. The memory controller 1120 may provide an address translation function that translates virtual addresses into physical addresses as instructions are executed. The memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, the computing system 1100 may contain a peripheral communications bus 1135, which communicates instructions from the CPU 1110 to, and/or receiving data from, peripherals, such as peripherals printer 1140, keyboard 1145, and mouse 1150, and may include any combination of printers, keyboards, and/or the sensors discussed herein throughout. An example of a peripheral bus is the Peripheral Component Interconnect (PCI) bus.

A display 1160, which is controlled by a display controller 1155, may be used to display visual output and/or other presentations generated by or at the request of the computing system 1100, such as in the form of a graphical user interface (GUI), responsive to operation of the aforementioned computing program(s). Such visual output may include text, graphics, animated graphics, and/or video, for example. The display 1160 may be implemented with a CRT-based video display, an LCD or LED-based display, a gas plasma-based flat-panel display, a touch-panel display, or the like. The display controller 1155 includes electronic components required to generate a video signal that is sent to the display 1160.

Further, the computing system 1100 may contain a network adapter 1165 which may be used to couple the computing system 1100 to an external communication network 1170, which may include or provide access to the Internet, an intranet, an extranet, or the like. The communications network 1470 may provide user access for the computing system 1100 with means of communicating and transferring software and information electronically. Additionally, the communications network 1470 may provide for distributed processing, which involves several computers and the sharing of workloads or cooperative efforts in performing a task. It is appreciated that the network connections shown are exemplary and other means of establishing communications links between computing system 1100 and remote users may be used.

A network adaptor 1165 may communicate to and from the network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of printing, the method comprising:
providing a print head configured to feed a print material filament from a spool through a material guide to a heated nozzle, an X-Y planar control for moving the print head in an X-Y plane, and a print platform upon which a base is printed;
detecting a filament spool indicium;
correlating the filament spool indicium to a physical characteristic of the print material filament stored in a first memory, wherein the physical characteristic of the print material filament includes ovality of the print material filament and one or more of print material filament tolerance, print material filament cooling temperature during print material filament production, print material filament cooling rate during the print material filament production, print material filament extrusion die size, print material filament production rate, number of sensors used to measure the print material filament ovality, type and/or model number of the sensors used to measure the print material filament ovality, geographical location of the print material filament production, and origin of raw materials used to produce the print material filament; and
modifying a print parameter responsive to the physical characteristic of the print material filament.

2. The method according to claim 1, wherein the physical characteristic of the print material filament is also includes a diameter of the print material filament.

3. The method according to claim 2, wherein the diameter of the print material filament is measured with a laser micrometer.

4. The method according to claim 1, wherein the filament spool indicium is one of a barcode, a QR code, or an RFID.

5. The method according to claim 1, wherein the modifying the print parameter step further comprises modifying a feed rate of the print material filament.

6. The method according to claim 5, wherein the feed rate of the print material filament is reduced so a target volume of the print material filament is deposited for a given length of the print material filament when a diameter of the filament is larger than a target diameter, and the feed rate of the print material filament is increased so the target volume of the print material filament is deposited for a given length of the print material filament when the diameter of the filament is smaller than a target diameter.

7. A 3D printer comprising:
a filament spool including an indicium;
a sensing device configured to read the indicium;
a first memory storing physical characteristic data for the filament spool, the physical characteristic data accessible by reading the indicium;
a print head configured to feed a print material filament from the spool through a material guide to a heated nozzle, wherein the physical characteristic data includes ovality of the print material filament and one or more of print material filament tolerance, print material filament cooling temperature during print material filament production, print material filament cooling rate during the print material filament production, print material filament extrusion die size, print material filament production rate, number of sensors used to measure the print material filament ovality, type and/or model number of the sensors used to measure the print material filament ovality, geographical location of the print material filament production, and origin of raw materials used to produce the print material filament;
an X-Y planar control for moving the print head in the X-Y plane;
a print platform upon which a base is printed; and
a processor to execute a print parameter based on the physical characteristic data.

8. The 3D printer according to claim 7, further comprising a second memory storing a physical characteristic lookup table, wherein the processor executes the print parameter based on a comparison of the physical characteristic data and the physical characteristic lookup table.

9. The 3D printer according to claim 7, wherein the sensing device is a laser micrometer.

10. The 3D printer according to claim 7, wherein the print parameter is a feed rate of the print material filament.

11. The 3D printer according to claim 10, wherein the feed rate of the print material filament is reduced so a target volume of the print material filament is deposited for a given length of the print material filament when a diameter of the filament is larger than a target diameter, and the feed rate of the print material filament is increased so the target volume of the print material filament is deposited for a given length of the print material filament when the diameter of the filament is smaller than a target diameter.

12. The 3D printer according to claim 7, wherein the indicium is one of a barcode, a QR code, or an RFID.

* * * * *